Figure 1:
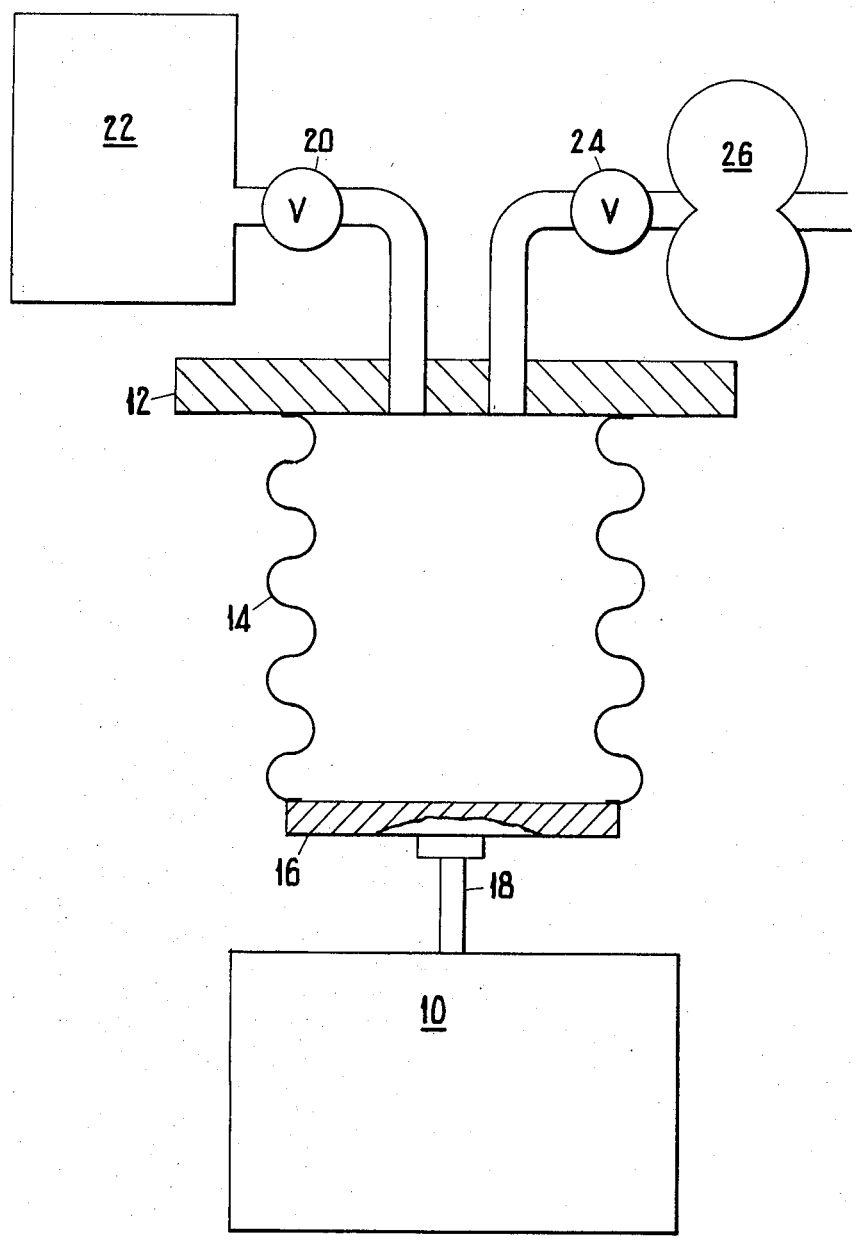

United States Patent [19]
Mertens et al.

[11] 3,772,510
[45] Nov. 13, 1973

[54] VIBRATION ISOLATORS FOR EVACUATED SCIENTIFIC INSTRUMENTS

[76] Inventors: George Firmin Mertens, 24 Springhill Towers, Harlow; Richard Stockbridge Page, 'Kaduna', St. Edmunds Ln., Great Dunmow, both of England

[22] Filed: June 22, 1972

[21] Appl. No.: 265,238

[30] Foreign Application Priority Data
June 23, 1971 Great Britain............... 29529/71

[52] U.S. Cl. .............................. 250/311, 73/430
[51] Int. Cl. ...................... H01j 37/26, G01n 23/00
[58] Field of Search ................. 73/430; 250/49.5 R, 250/49.5 A

[56] References Cited
UNITED STATES PATENTS
2,370,373  2/1945  Ruska et al. ...................... 250/49.5
3,514,600  5/1970  Taylor ............................. 250/49.5

OTHER PUBLICATIONS
"The Electron Microscope," second edition, by E. F. Burton et al., published by Reinhold Publishing Corp., New York, 1946, page 225

"Functional Features of a 500KV Electron Microscope" by T. Taoka et al. from The Journal of Scientific Instruments, Vol. 44, 1967, pages 747–749.

Primary Examiner—William F. Lindquist
Attorney—Thomas E. Fisher et al.

[57] ABSTRACT

A vibration isolator is disclosed which is particularly effective to isolate low frequency vibrations. Basically, in a preferred form it is an elastically deformable container with a partial vacuum therein. The isolator is disposed between an object which is to be vibration isolated, and a fixed support. Several isolators can be used in parallel. In one form, the vibration isolator comprises an elastic bellows extending between two rigid members. Further improved performance can be obtained by coupling the vibration isolator to a vacuum reservoir.

13 Claims, 4 Drawing Figures

VIBRATION ISOLATORS FOR EVACUATED SCIENTIFIC INSTRUMENTS

This invention relates to devices and arrangements for supporting a mass with vibration isolation.

Certain scientific instruments, such for example as electron microscopes, require to be mounted or supported in such a fashion that they are isolated from vibrations in their surroundings. Such vibrations may be caused by traffic, other machinery, or even movements of the instruments' operators. Conversely, it is also desirable that machinery produced vibrations should not be transmitted to their surroundings. Vibration isolating supports such as bonded metal/rubber mountings are known, but they are not adequately effective to isolate very low frequency vibrations, particularly below 10 Hz.

It is therefore an object of the invention to provide improved devices and arrangements for supporting a mass with vibration isolation.

According to a first aspect of the invention, a device for supporting a mass with vibration isolation comprises an elastically deformable and partially evacuated sealed container.

The container may be such that only a portion of the container is elastically deformable, and this portion may take the form of a bellows, which may be of metal or rubber. If the bellows is generally cylindrical and made of rubber, plastics material, or another relatively flexible material, the region of maximum diameter of the or each convolution is preferably prevented from collapsing by a relatively rigid support, for example, a ring, or a perforated disc within the bellows. Alternatively, the bellows may be an elastic disc or annulus, with one or more concentric convolutions. The container may include two rigid members between which the bellows extend and which are preferably adapted to be connected on the one hand to the mass to be supported and on the other hand to a support member. The container may be so constructed or adapted by the provision of stop means as to prevent over-extension and/or collapse, and preferably also includes means for indicating that the deformation of the container is such that further deformation is possible without immediate collision with the stop means. The container may be such that its principle deformation is along a single linear axis, which is preferably the axis of circular symmetry of the bellows where such bellows are employed.

According to a second aspect of the invention an arrangement for supporting a mass with vibration isolation comprises an elastically deformable container and evacuation means pneumatically coupled to the container for controllably evacuating the container. The container is preferably also pneumatically coupled to a reservoir whereby to increase the period of natural oscillation of a mass supported by the arrangement. The reservoir may have a volume of the order of the internal volume of the container, or substantially greater.

The container of the second aspect of the invention may be the same as any of the forms of container in the first aspect of the invention except for such break or breaks in the sealing as may be required for pneumatic coupling to the evacuation means, and for pneumatic coupling to the reservoir where the latter is included in the arrangement.

Figure 2:
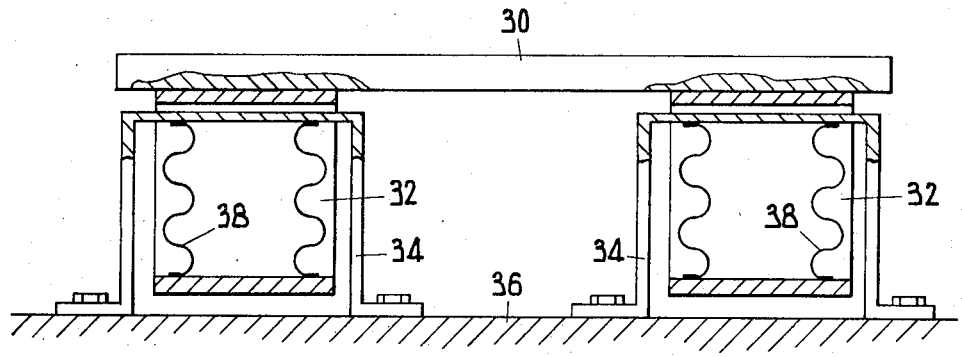
Figure 3:
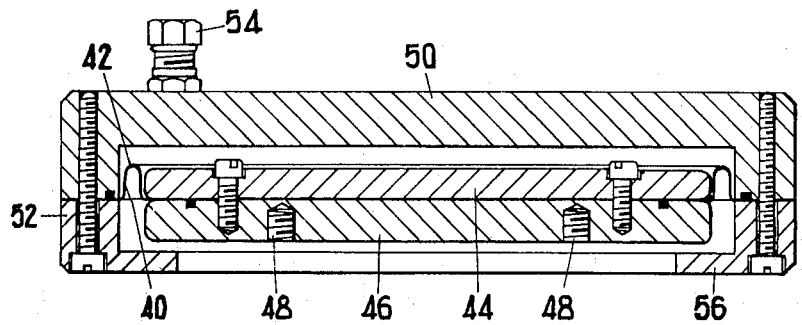
Figure 4:
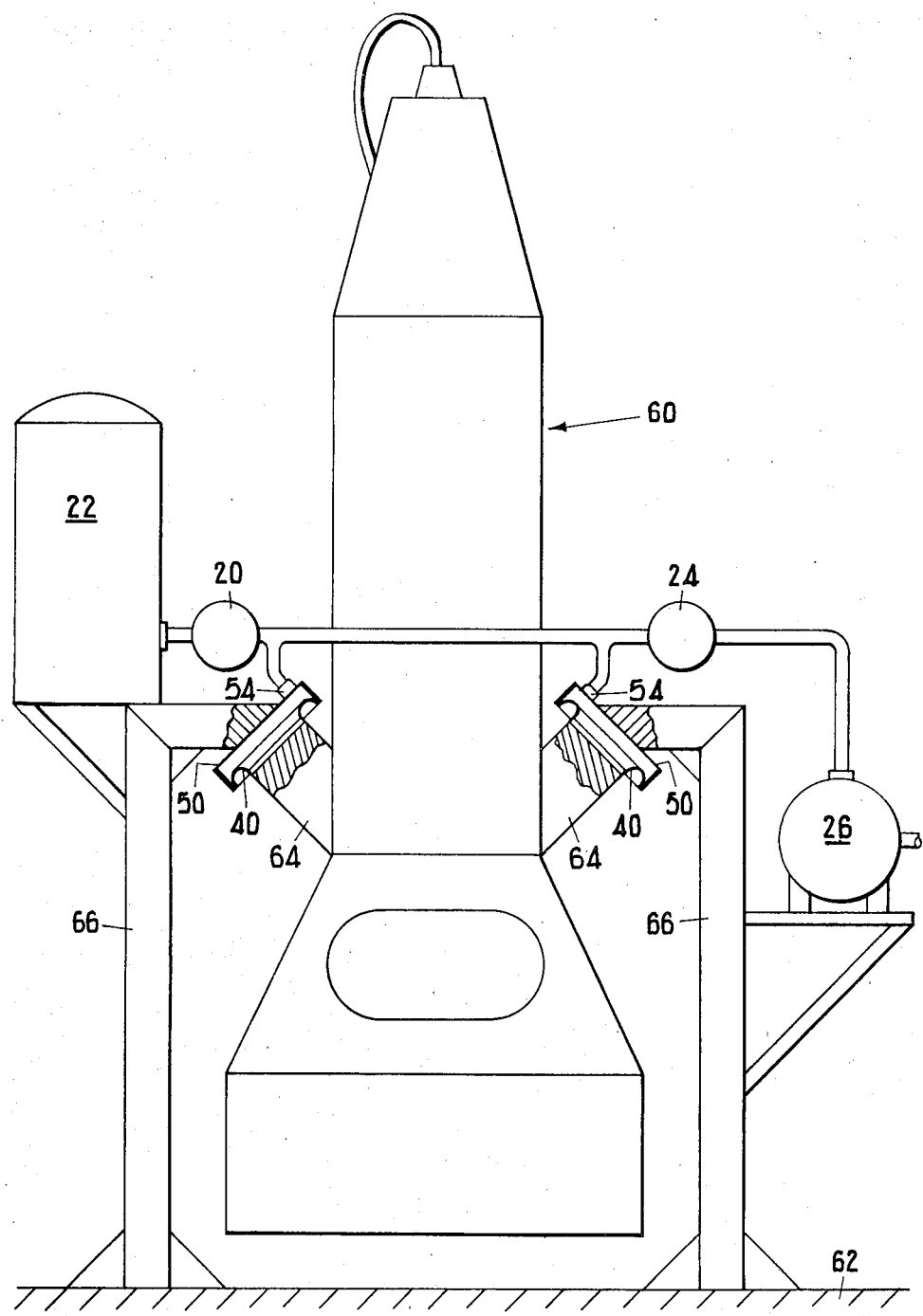

Embodiments of the invention will now be described by way of example with reference to the accompanying drawings wherein:

FIGS. 1, 2, and 3 are schematic diagrams of first, second, and third embodiments of the invention, respectively; and FIG. 4 is a schematic illustration of an application of the invention.

Referring first to FIG. 1, a mass 10 is to be suspended from a fixed structure 12 without vibration, particularly low-frequency vibration, being transmitted between the mass 10 and the structure 12. To this end, an elastically deformable bellows 14 is interposed between the mass 10 and the structure 12. The bellows 14 is generally cylindrical, with circumferential convolutions, and can be of any suitable material such as metal, rubber, or plastics material. The bellows 14 may be a unitary structure, or a multi-piece fabrication, such as a stack of peripherally bonded annuli. The bellows 14 is sealed at its upper end by the structure 12, and at its lower end by a disc 16 which adapted by a fastening means 18 to enable the mass 10 to be secured thereto.

The interior of the bellows 14 is pneumatically coupled by way of a first air control valve 20 to an air-tight reservoir 22. The interior of the bellows 14 is also pneumatically coupled by way of a second air control valve 24 to a vacuum pump 26 which is operable to evacuate the interior of the bellows 14 to a desired extent.

In order to discuss the theory of the invention, let it be assumed that the interior of the bellows 14 is evacuated by the pump 26 to a pressure $p$ which is less than the surrounding atmospheric pressure $P$, and that the valves 20 and 24 are closed. If the vertical height of the bellows 14 is $L$, and a vertical disturbance is given to the mass 10 such as to produce a vertical disturbance $x$, the period $T$ of simple harmonic motion of the mass 10 in a vertical direction is given by:

$$T = 2\pi \sqrt{X/\ddot{X}} = 2\pi \sqrt{[L(P-p)/1.4\ gp]}$$

where $g$ is the gravity constant.

This gives a constant level suspension system with a rate which can be varied by altering the internal pressure $p$, and the weight of the mass 10. If $p$ is very small, say $10^{-3}$ Torr, $T$ can be very long, say 200 seconds, with a negligible spring rate for the bellows 14. In practice, such long periods may not be achieved due to the finite spring rate of the bellows 14.

If $S$ is the spring rate of the bellows 14, in terms of force per unit distance, and $A$ is the mean cross-sectional area of the bellows 14, then the equation of motion becomes:

$$x = \frac{-L(P-p)}{g\left(1.4p + \frac{SL}{A}\right)} \ddot{x}$$

Thus the period $T$ is limited by the effect of $S$.

A practical example will now be given to illustrate the functioning of the invention.

A bellows of 4 inches diameter, 3 inches length, and 8 lbs. wt/inch spring rate pumped out to 300 Torr will support 112 lb.wt. If pumped out to $10^{-3}$ Torr the bellows will support 185 lbs.wt.

The period $T$ at 300 Torr = 0.53 seconds or 0.6 seconds if $S = 0$.

The period $T$ at $10^{-3}$ Torr $= 1.54$ seconds or 400 seconds if $S = 0$.

The performance of the suspension system may be considerably modified by connecting the reservoir 22 to the interior of the bellows 14, i.e., by opening the valve 20. If the volume of the reservoir 22 is $V$, then (neglecting the volume of the coupling pipe) the equation of motion becomes:

$$x = \frac{-L(P-p)}{g\left(\frac{1.4p}{v/AL} + \frac{SL}{A}\right)} \ddot{x}$$

Thus the period T is considerably increased by connecting a reservoir to the bellows. ($T$ can be much increased by appropriate increases in $V$.)

With the above numerical example, and with $V=1$ cubic foot, then for $p = 300$ Torr, $T = 1.17$ seconds or 4.1 seconds if $S = 0$; and for $p = 10^{-3}$ Torr, $T = 1.54$ seconds, or 2,800 seconds if $S = 0$.

Thus a reasonable volume of reservoir makes a medium pressure system potentially very useful. A medium pressure system has the advantage that adjustments can be made to the load level by small variations of the pressure $p$, readily achievable by appropriate operation of the valve 24 and the pump 26.

The above description of the invention shows how very long oscillatory periods can be achieved in a compact arrangement. In the prior art of vibration isolation, apparatus was suspended by a spring or springs. In order to isolate low frequencies, long springs were necessary. For example, the present invention provides a vibration isolator which with a height of ten inches is equivalent to a conventional spring of eight to ten feet unextended length.

Reverting to the perpendicular embodiment shown in FIG. 1, various modifications are possible. For example, if the bellows 14 is of a relatively non-rigid material, such as rubber, it may be desirable to prevent undue distortion, or collapse, by supporting the outermost parts of the convolutions by internally fitted rings or perforated discs. The bellows 14 and its associated components may exhibit resonances at various frequencies, such that damping is preferable, for example by frictional, fluid, or electrical devices.

With viscous damping, the samping force $F$ is given by $F = r\dot{x}$, where $r$ is the damping coefficient in lbs./in./sec.

The equation of motion becomes $$\ddot{X} + 2b\dot{x} + a^2 x = 0$$

and the oscillation period becomes $$T_{(damped)} = 2\pi / \sqrt{a^2 - b^2}$$

where $$a^2 = [g/(P-p)][(1.4\, p/V/A + L) + (S/A)]$$

and $$b = [rg/2A\,(P-p)]$$

The condition for critical damping is $a = b$.

A second embodiment of the invention will now be described with reference to FIG. 2. In this figure, which is partly in section, 30 represents a platform upon which is to be mounted an object, such as a delicate scientific instrument, which is to be isolated from deleterious vibration, or conversely a vibration producing object (e.g. a vacuum pump) whose vibrations are to be isolated from its surroundings. From the underside of the platform 30 depend a plurality of brackets 32 which interlink in chain-like fashion with a like plurality of inverted U-shaped brackets 34 secured to the floor or other fixed supporting structure 36. Only two pairs of brackets are shown, but any appropriate number from one upwards may be used, according to the shape and size of the platform 30, and the nature of the load.

Between each bracket 32 and its associated bracket 34 is a sealed and partly evacuated elastically deformable bellows 38. Unlike the bellows 14 of FIG. 1, each bellows 38 is permanently sealed. The requisite subatmospheric pressure within each bellows 38 is obtainable either by partial evacuation before sealing, or by sealing the bellows in a partly collapsed condition, and allowing the extension under load to reduce the internal pressure.

Even though the internal pressure of the permanently sealed bellows 38, and hence its performance, is controllable only indirectly by temperature variation and by variable loading (within the elastic limit), rather than directly as in the arrangement of FIG. 1, the arrangement of FIG. 2 functions in the manner described with reference to FIG. 1 to support the platform 30 substantially without transmitting vibrations between it and the floor 36. A reservoir may be coupled to the bellows 38 to increase their period.

The bellows described above and illustrated in FIGS. 1 and 2 are generally cylindrical, and while vastly superior to the prior art spring type vibration isolators of equivalent performance in respect of size, they do require a certain amount of height. The third embodiment of the invention, now to be described with reference to FIG. 3, is very compact.

In FIG. 3, a generally disc shaped bellows 40 is employed, with a single annular convolution 42. The central part of the bellows 40 is clamped in airtight manner between two circular plates 44 and 46, the lower plate 46 (corresponding to the disc 16 of FIG. 1) being adapted by the provision of threaded holes 48 to have fastened thereto the object to be mounted with vibration isolation.

The periphery of the bellows 40 is clamped in airtight manner between two annular members 50 and 52. The member 50 (corresponding to 12 in FIG. 1) is adapted to be mounted on or form part of a fixed support structure (not shown in FIG. 3), and is provided with a union 54 for connection of the interior of the assembly to means for partly evacuating it, and to a reservoir if that is included in the system. The member 52 has a flange 56 which prevents undue movement of the plates 44 and 46, and hence rupture of the membrane 40, as for example upon excessive loading.

The bellows 40 may have any appropriate number of concentric annular convolutions, but with the single convolution 42 as illustrated in FIG. 3, the bellows 40 may conveniently be constituted by a rolling diaphragm of the type sometimes used in place of piston rings to form the seal between the pistons and cylinders of gas compressors.

If a not particularly low natural oscillatory period is required for the embodiment of FIG. 3, no reservoir (or only a small one) may be required, but for comparable or larger periods than the cylindrical bellows embodiments, a correspondingly larger reservoir is needed in view of the inherently smaller internal volume.

FIG. 4 is a highly schematic illustration of a practical application of the invention. An electron microscope 60, being a scientific instrument particularly susceptible to vibration with deleterious effects, requires to mounted with vibration isolation from its surroundings such as may be transmitted through the laboratory floor 62. To fulfil this requirement, the microscope 60 is provided with a plurality of mounting brackets 64. A support structure 66 is mounted on the floor 62, and between the upper ends of the structure 66 and each bracket 64 is interposed a vibration isolator of the type described with reference to FIG. 3. The vibration isolators are pneumatically connected in parallel, and are associated with a vacuum reservoir and a vacuum pump, as in the arrangement of FIG. 1, like parts in FIG. 4 being given the same reference numerals as in FIGS. 1 and 3.

The brackets 64 are such that the axes of the vibration isolators are not vertical (e.g. as in FIG. 2), but are inclined at 45° from the vertical, and are inwardly directed to intersect approximately at the centre of gravity of the microscope 60. This has the advantage that the microscope 60 is not only isolated from vertical vibrations, but also from lateral and pendular vibrations.

Only two vibration isolators are shown for the sake of clarity (and only two may suffice in some circumstances) but it is preferred to utilise three, four, or six isolators arranged symmetrically round the microscope 60 in the manner shown for the two isolators actually illustrated.

The vacuum pump 26 could also be mounted on vibration isolators, conveniently the structure of FIG. 2. The vacuum pump 26 may also be utilised for the evacuation of the microscope 60, and conveniently is the roughing vacuum pump.

Vibration isolators of a specific structure other than as shown in FIG. 3 could alternatively be used in FIG. 4 to mount the microscope 60, provided they constitute partially evacuated elastically deformable containers in accordance with the invention.

The vibration isolators shown in FIGS. 1, 2, and 3 are containers which have only parts of their bounding surfaces (i.e. the bellows) elastically deformable. A container whose entire bounding surface was elastically deformable could be employed, provided it was constructed or adapted so as not to collapse unduly due to its subatmospheric internal pressure. Bellows which are other than cylindircally or annularly shaped may be used within the scope of the invention.

We claim:

1. A vibration isolated system comprising:
   a. an evacuable scientific instrument to be suspended with vibration isolation;
   b. fixed support means for suspending said instrument;
   c. at least one vibration isolator interposed between said instrument and said fixed support means;
   d. said vibration isolator having a first member secured to or forming part of said fixed support means;
   e. said vibration isolator having a second member secured to or forming an integral part of said instrument;
   f. said vibration isolator having a third member extending between said first and second members such that said first, second, and third members together form an airtight container, said third member being elastically deformable such that said instrument is elastically suspended by said fixed support means; and
   g. a vacuum pump pneumatically coupled both to said evacuable instrument and to said airtight container for controllably evacuating both said instrument and said container to a sub-atmospheric pressure.

2. The system of claim 1 including an airtight reservoir pneumatically coupled to the container, said reservoir having a volume at least of the order of the interior volume of the airtight container formed by said first, second and third members.

3. The system of claim 1 wherein said third member is a bellows.

4. The system of claim 3 wherein at least part of said second member lies within and spaced from said first member, said first and second members have opposing faces, and said bellows is secured between said opposing faces.

5. The system of claim 4 wherein the bellows is generally a flat annular and has at least one annular convolution, said first member has a cylindrical interior surface, and second member has a circular periphery of lesser diameter than the diameter of said cylindrical interior surface and is disposed within and generally coaxial with said cylindrical interior surface, and the bellows extends in a generally radial direction between said first and second members with said convolution generally coaxial with said cylindrical interior surface.

6. The system of claim 3 wherein said bellows is generally cylindrical.

7. The system of claim 6 wherein the cylindrical bellows has a plurality of circumferential convolutions of alternating minimum and maximum diameter axially along the bellows, and each said convolution is supported internally at its region of maximum diameter by a member having a rigid circular periphery.

8. The system of claim 3 wherein the bellows is generally a flat annulus and has at least one annular convolution.

9. The system of claim 1 wherein a plurality of said vibration isolators are interposed between the evacuable scientific instrument and the support means at relatively spaced apart positions, the first member of each isolator being secured to or forming an integral part of said support means, the second member of each isolator being secured to or forming an integral part of said evacuable scientific instrument, each said isolator having an axis along which it is principally deformable, said isolators being so disposed that each said axia lies substantially on the surface of a hypothetical cone and each said axis is substantially aligned with the vertex of said cone, the axis of said cone being substantially vertical and not substantially distant from the centre of gravity of the evacuable scientific instrument.

10. The system of claim 9 wherein the apex of said cone is substantially coincident with the centre of gravity of said evacuable scientific instrument.

11. The system of claim 9 wherein the half-angle of said cone is substantially 45° downwards from the vertical.

12. The system of claim 1 wherein said evacuable scientific instrument is an electron microscope.

13. The system of claim 12 wherein said vacuum pump is the roughing vacuum pump of the electron microscope.

* * * * *

UNITED STATES PATENT OFFICE
CERTIFICATE OF CORRECTION

Patent No. 3,772,510  Dated November 13, 1973

Inventor(s) GEORGE FIRMIN MERTENS

It is certified that error appears in the above-identified patent and that said Letters Patent are hereby corrected as shown below:

Column 2, line 10, delete "practicu" and substitute -- particu -- .

Column 2, line 40, delete "$\sqrt{X/X} = 2\P$" and substitute -- $\sqrt{\dfrac{X}{\ddot{X}}} = 2\P$ -- .

Column 3, line 37, delete "perpendicular" and substitute -- particular -- .

Signed and sealed this 23rd day of July 1974.

(SEAL)
Attest:

McCOY M. GIBSON, JR.
Attesting Officer

C. MARSHALL DANN
Commissioner of Patents